C. H. HILL.
COMBINATION GANG SOLE MOLD.
APPLICATION FILED APR. 13, 1914.
1,136,336. Patented Apr. 20, 1915.
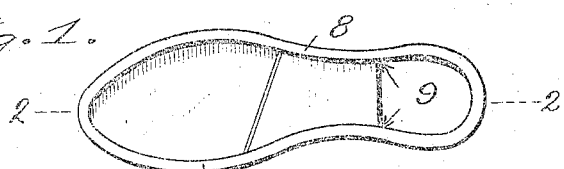
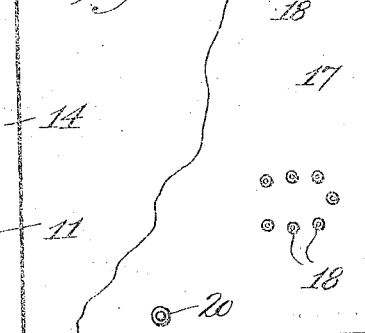
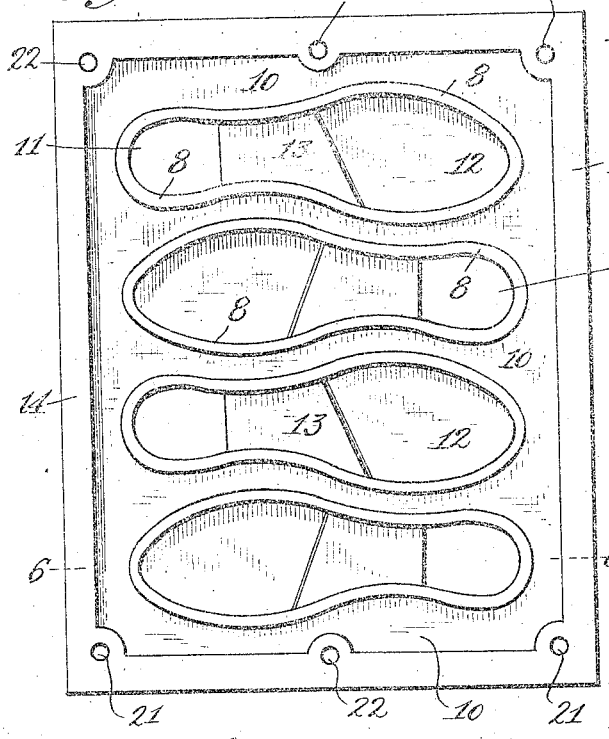
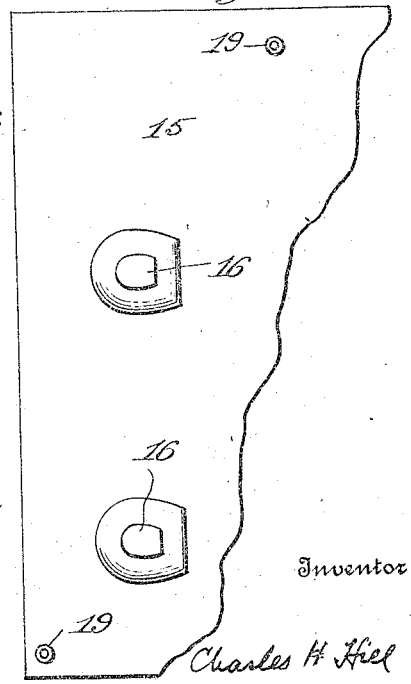
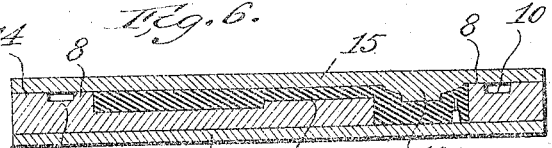
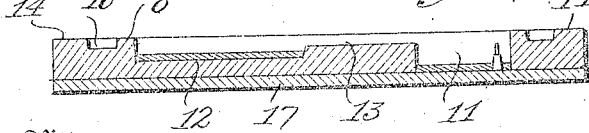
Witnesses
Edith C. Ford
Geo C Herbert
Inventor
Charles H Hill
By Charles W Lovett
Attorney

UNITED STATES PATENT OFFICE.

CHARLES H. HILL, OF LYNN, MASSACHUSETTS.

COMBINATION GANG SOLE-MOLD.

1,136,336.

Specification of Letters Patent. Patented Apr. 20, 1915.

Application filed April 13, 1914. Serial No. 831,663.

*To all whom it may concern:*

Be it known that I, CHARLES H. HILL, citizen of the United States of America, residing at Lynn, in the county of Essex and State of Massachusetts, have invented certain new and useful Improvements in Combination Gang Sole-Molds, of which the following is a specification, such as will enable others well versed in the art to which it appertains to make and use the same.

This invention relates to improvements in molds used in the manufacture of soles of rubber, or other like material, for use on shoes or other foot wear.

To fully understand the scope of my invention, one must first comprehend the conditions under which such soles have heretofore been manufactured. That is to say, it is customary for rubber manufacturers to use unit molds which are structurally weak owing to a necessary narrow marginal frame. This weakness results in a great loss to manufacturers from breakage of the molds caused by the pressure to which they are subjected and which is necessarily applied to insure a perfect product. These unit molds are used in conjunction with plain steel plates between which they are placed before the pressure is applied thereto. In the repetition of use, these plates become scarred and creased by the edges or margins of the unit molds, which scars and creases reproduce themselves on the surface of the finished soles, detracting from their appearance and market value. It is also both difficult and expensive to secure a plurality of unit sole molds of an unvarying thickness, so that, when numerous units are used in the same press and between the same steel plates simultaneously, it is impossible to give all the soles in the molds the same degree of pressure at the same time. This lack of uniformity in pressure results in a further great loss to manufacturers from porous soles, and soles not properly flowed and filled out.

The objects of my invention are, first, to lessen the breakage of molds by insuring greater strength. Second, to secure a uniform pressure on the contents of a plurality of molds between the same plates, so as to eliminate the loss in forming faulty soles by lack of equal pressure. Third, to avoid the repeated scarring and creasing of the steel plates between which the soles are pressed, so as to eliminate the reproduction of such scars and creases on the finished product. Fourth, to provide an interchangeability of various parts so as to adapt the mold to produce varying thicknesses and styles of soles. Fifth, to provide for the accurately placing of the suction back section and pins which locate the nail holes and burs in the heel portion of the sole, and further, to secure other advantages and results hereinafter referred to in connection with the description of the various parts. These objects are attained by the means illustrated in the accompanying drawing, in which:

Figures 1 and 2, represent a plan view and a longitudinal section respectively of a unit mold ordinarily used by rubber sole manufacturers. Fig. 3, is a plan view of my improved gang mold with the top and bottom plates removed. Fig. 4, is a plan view of a portion of a bottom plate. Fig. 5, is a view of a portion of a top plate looking at the underside thereof. Fig. 6, is a vertical section on the line 6—6 of Fig. 3 with the top and bottom plates in position, and Fig. 7, is a like section with the top plate removed and showing the filler plates inserted.

Similar reference numerals in all the figures of the drawing designate like parts.

Molds of this character, are necessarily provided with relatively narrow contour frames 8, which form the boundaries of the soles to be cast, and as clearly seen in Figs. 1 and 2, the boundary frame around the heel portion of the single molds is very slender and frequently is ruptured or broken at the points indicated at 9 by the pressure applied to the mold and because it lacks a reinforcement.

As before stated, it is almost impossible and very expensive, to secure a plurality of these single molds of unvarying thickness, consequently the slightest difference in height will cause an unequal pressure in the different molds and not only produce imperfect or porous soles, but also scar and mark the pressure plate. To avoid these difficulties and disadvantages, my improved mold preferably comprises a plurality of the single molds, each provided with its narrow border, margin, or contour frame 8 secured together with an integral web or depressed portion 10 and arranged in reversed position, that is, the toe portions of alternate molds being adjacent the heel portions of the next mold. Arranged in this manner, the preponderance of metal around the comparatively narrow toe portions reinforces and strengthens the weak apertured heel portions of the adjacent forms.

A plural mold of this character will avoid the breaking of the heel portions, as will happen in the single molds, and can be more easily constructed to provide an unvarying thickness to prevent the scarring of the plate and the casting of imperfect or porous soles.

Each sole form or mold is provided with a through-aperture 11 which forms the heel, a depression 12 to form the sole proper, and a shallow portion 13 to form the connection or shank between the heel and sole portions.

To further secure an even pressure with a plurality of molds and to prevent the marring of the pressure plates, the plural mold just described is provided with a relatively wide peripheral frame 14, the same being formed of the same unvarying thickness of the contour frames 8 of the molds, thus when the pressure plates are applied, this relatively wide peripheral frame will limit and prevent any uneven pressure upon the contour frames 8.

Whenever it is desired to cast suction or weight-reducing recesses in the upper surfaces of the heel portions and to form nail holes and burs in the lower surfaces of said heel portions, an upper plate 15 having projections 16, and a lower plate 17 having a series of projections 18 are provided, these plates being adapted to cover the entire upper and under surfaces of the plural mold, and are accurately positioned by dowel pins 19 and 20 on the upper and lower plates respectively, and dowel holes 21 and 22 in the plural mold.

Three dowel pins are provided on each plate, two of which are located at one end and the third being positioned centrally in the opposite end. This arrangement allows of both plates being securely held in position at both ends with relatively long dowel pins which engage separate holes. The dowel pins are preferably of smaller diameter at their tops than at their bases, whereby they will easily engage the dowel holes, but are sufficiently large at their base to secure a tight fit when fully inserted.

For producing soles and heels of lighter weight, I provide a series of removable members, formed to fit within the heel cavity and sole portion (see Fig. 7). When using these members an interchangeable bottom plate can be used, identical with that shown in the drawings, excepting that there are no series of pins thereon.

Any desired corrugations, names, trade marks, or other designation may be imprinted on the finished soles by having suitable prepared surfaces on the removable members.

From the above description, it will be seen that a practical gang or plural mold is provided for forming shoe soles from rubber or like material, a mold that will lessen the cost of manufacture in preventing waste by eliminating the casting of imperfect articles.

Having thus fully described the invention, what is claimed is:—

1. A gang sole mold, comprising a series of sole forms formed in a single plate, said forms embodying heel cavities formed entirely through the plate, and an integral depressed web connection between and around the several forms.

2. A gang sole mold, comprising a series of sole forms formed in a single plate, said forms embodying heel cavities formed entirely through the plate and contour frames, and an integral depressed web connection between and around the several forms.

3. A gang mold, comprising a series of sole forms each having a contour frame which is connected to the adjacent frame by a depressed web, a peripheral frame of the same height of the contour frames, and bottom and top plates removably connected to said peripheral frame.

4. A gang sole mold, comprising a series of sole forms formed in a single plate, said forms embodying heel cavities formed entirely through the plate and depressed sole portions, and an integral depressed web connection between and around the several forms.

5. A gang sole mold, comprising a series of sole forms formed in a single plate, said forms embodying heel cavities formed entirely through the plate, a depressed sole portion, and a shank portion thicker than said sole portion, and an integral depressed web connection between and around the several forms.

6. A gang sole mold, comprising a series of sole forms formed with a single plate, each of said forms embodying a heel cavity and a depressed sole portion, and an integral depressed web connection between and around the several forms.

7. A gang sole mold, comprising a series of sole forms formed with a single plate, each of said forms embodying a heel cavity, a depressed sole portion, and a shank portion thicker than the sole portion, and a depressed web connection between and around the several forms and integral therewith.

8. A gang sole mold, comprising a series of sole forms formed with a single plate, each of said forms embodying a heel cavity and a depressed sole portion, a contour frame surrounding each cavity and sole portion, and a depressed web connection between and around the several forms and integral therewith.

9. A gang sole mold, comprising a series of sole forms formed with a single plate, each of said forms embodying a heel cavity and a depressed sole portion, a contour frame surrounding said cavity and sole portion, a depressed web connection between and around the several forms and integral therewith, and a second frame surrounding and spaced from said contour frames, of equal height therewith, and integral with said web connection.

10. A gang sole mold, comprising a series of sole forms formed with a single plate, each of said forms embodying a heel cavity and a depressed sole portion, a contour frame surrounding said cavity and sole portion, a depressed web connection between and around the several forms and integral therewith, and means integral with the depressed web and spaced from said forms for preventing an unequal pressure on said forms.

11. A sole mold, comprising a sole form embodying a heel cavity and a depressed sole portion, a contour frame surrounding said cavity and sole portion and having a relatively narrow upper edge, relatively wide means spaced from said form and of equal height with said contour frames for preventing an unequal pressure on said forms, and a depressed means connecting said contour frame and pressure regulating means, said regulating means, depressed means and contour frame being formed in a single plate of metal.

In testimony whereof I hereunto affix my signature in presence of two witnesses.

CHARLES H. HILL.

Witnesses:
NORA L. CONDON,
CHARLES W. LOVETT.